United States Patent
Rebouillat et al.

(10) Patent No.: US 6,891,003 B2
(45) Date of Patent: May 10, 2005

(54) FIBER COATED WITH WATER BLOCKING MATERIAL

(75) Inventors: Serge Rebouillat, Echenevex (FR); Friedrich V. Pfister, Meyrin-Geneva (CH)

(73) Assignee: E.I. du Pont de Nemours and Company, Wilmington, DE (US)

(*) Notice: Subject to any disclaimer, the term of this patent is extended or adjusted under 35 U.S.C. 154(b) by 207 days.

(21) Appl. No.: 10/317,575

(22) Filed: Dec. 12, 2002

(65) Prior Publication Data

US 2003/0124350 A1 Jul. 3, 2003

Related U.S. Application Data

(62) Division of application No. 09/443,695, filed on Nov. 19, 1999, now Pat. No. 6,586,094.
(60) Provisional application No. 60/109,719, filed on Nov. 24, 1998.

(51) Int. Cl.$^7$ .................................................. C08F 2/00
(52) U.S. Cl. ............................ 526/80; 526/60; 526/61; 526/72; 526/902; 526/922
(58) Field of Search .......................... 526/80, 60, 61, 526/72, 902, 922, 319, 320, 329.2; 525/367, 329.1, 329.2, 323.3, 369

(56) References Cited

U.S. PATENT DOCUMENTS

| 4,837,077 | A |   | 6/1989 | Anton et al. |
| 5,330,874 | A | * | 7/1994 | Mahabadi et al. ..... 430/137.13 |
| 5,389,442 | A |   | 2/1995 | Arroyo et al. |
| 5,496,675 | A | * | 3/1996 | Van Dusen et al. ..... 430/137.13 |
| 5,635,569 | A |   | 6/1997 | Sackmann et al. |

FOREIGN PATENT DOCUMENTS

| EP | 0 188 959 | 7/1986 |
| EP | 0 666 243 | 2/1995 |
| EP | 0 779 389 | 6/1997 |
| WO | WO 93/18223 | 9/1993 |
| WO | WO 96/40849 | 12/1996 |
| WO | WO 97/08579 | 3/1997 |
| WO | WO 98/54395 | 12/1998 |

* cited by examiner

Primary Examiner—Tatyana Zalukaeva

(57) ABSTRACT

The present invention relates to a fiber coated with a water blocking material that includes an essentially water free dispersion comprising a superabsorbent polymer and a dispersing medium. The fibers made according to this invention may be used, for example, as fiber reinforcing material used in the manufacture of cables, and in particular in yarns for fiber optical cables that use optical light wave guides for optical communication transmissions.

11 Claims, No Drawings

FIBER COATED WITH WATER BLOCKING MATERIAL

This Application is divisional of application Ser. No. 09/443,695 filed Nov. 19, 1999, now U.S. Pat. No. 6,586,094 which claims benefit of Provisional 60/109,719 filed Nov. 24, 1998.

BACKGROUND OF THE INVENTION

1. Field of the Invention

The present invention relates to the use of a water blocking material in the form of a surface coating on a fiber. The substrate may be used in a fiber optic cable to prevent water ingression into the cable.

2. Description of the Related Art

Many processes for the treatment of substrates with water blocking materials are known. In particular fibers, fibrous materials or yarns are impregnated with water blocking materials in certain applications where water is undesirable.

For example, water blocking materials are used in fiber optic cables to prevent ingression and propagation of water in the cable. Fiber optic cables are normally made by surrounding wave guides with reinforcing fibers that prevent elongation of the cable, and those reinforcing fibers are then encased in plastic. If water enters the fiber optic cable, it migrates inside the cable, usually longitudinally by capillary action, until the water contacts the sensitive wave guides and ultimately optical network connection boxes. The wave guides are made of glass, and when contacted by water become dull. The efficiency of the signal transmission through the wave guide drops until the wave guides can no longer transmit a signal. When that happens, the damaged portion of the cable must be located and then replaced. Since these fiber optic cables may be buried underground or may be placed along the bottom of large bodies of water, the location and replacement of the damaged sections of the cable can be time consuming and expensive.

As a result of these problems, there have been developed numerous methods to protect the fiber optic cable from water ingression. One method has been to coat the surrounding reinforcing fibers with a water blocking material so that if water should leak through the plastic casing, that water will be absorbed by the water blocking material on the reinforcing fibers to prevent damage to the wave guides.

There are processes in which the treatment of fibers is carried out with water blocking material as an aqueous dispersion such as in EP-A-0 351 100. One disadvantage of this process is that the viscosity of these aqueous dispersions is very high.

In EP-A-0 666 243, a method is disclosed in which glass fiber bundles are treated with a dispersion of a water absorbing material in an oil, wherein poly(sodium acrylate) is the water absorbing medium. In the same way derivatives of polyacrylic acid are disclosed in WO93/18223 as super-absorbing materials. In both cases, the water blocking materials are used in water-in-oil emulsions for the treatment of substrates, with the super-absorbing materials being contained in the aqueous phase. These emulsions are, however, complicated to manufacture and require the use of emulsifying agents.

In general, conventional water blocking materials are based on cross linked polyacrylics and/or cross linked polyacrylates, such as water-in-oil emulsions. These types of water blocking materials all contain water and oil, and when the material is applied to a fiber or yarn some of the water and oil must be removed. The removal of water and oil is an additional processing step that is energy intensive, limits productivity and is an environmental burden.

What is needed, therefore, is a water blocking agent that is effective and is easy to apply to fibers.

None of the known water blocking materials, when applied to a substrate, completely meet the following four criteria defined as ideal industry standards and related manufacturing requirements:

First, the substrate coated with the superabsorbent polymer must be easily processable when used in manufacturing, for example, optical cables. This means that the reinforcing superabsorbent coated substrate must have good frictional properties and a low tendency to generate deposits when spiraled or braided around a core optical fiber. Conventional superabsorbent polymers used for the coating of substrates are known to be prone to deposits due mostly to the high stiffness of the film formed or their relatively large particle sizes, that is, above 40 microns.

Secondly, the residual water present in substrates coated with conventional superabsorbent polymers causes blistering, for example, during the extrusion of the outer layer jacket of an optical cable. Therefore, such coated substrate must be as dry as possible to avoid this blistering problem. For example, water in oil emulsions of superabsorbent polymers contain a substantial proportion of water (up to ⅓) which may cause blistering when substrates having high loadings of the superabsorbent polymers are extruded above certain temperatures and thus be detrimental to the overall quality of the cable.

Thirdly, the substrate coated with the superabsorbent polymer must withstand temperatures encountered during thermal processing, such as the extrusion process mentioned above. It is known in the art that most superabsorbent polymers do not tolerate temperature cycling and therefore lose their ability to absorb water. The detrimental chemical mechanism is generally associated with the formation of inter-chain anhydrides which does not constitute a good entrapping network for the "ingressing" water.

Fourthly, most aerial or liaison cables (sometimes referred to as riser cables) which connect aerial/underground cables to building networks, are exposed to freezing conditions in most regions where they are used. Therefore it is essential that the cable in general and the coated substrate in particular be resistant to freezing conditions. The formation of ice within the cable structure does not only affect the dimensional stability of the system but also may cause internal damage related to the reduced flexibility associated with a microbending crushing effect. Therefore, the strength of the coated substrate in the cable is very important and therefore its dryness is absolutely essential. Unfortunately a large number of known superabsorbent polymers not only contain water but also are not resistant to freezing conditions.

In view of the above, an object of the present invention is to provide a substrate coated with a water blocking material which meets the four criteria discussed above. Such substrate is highly processable, essentially water free and temperature tolerant, that is resistant to freezing and temperature cycling.

SUMMARY OF THE INVENTION

The present invention relates to a fiber coated with a water blocking material that includes an essentially water free dispersion comprising a superabsorbent polymer and a dispersing medium. The fibers made according to this invention may be used, for example, as fiber reinforcing material in the manufacture of cables, and in particular in yarns for fiber optical cables that use optical wave guides for communication transmissions.

DETAILED DESCRIPTION

The present invention relates to a fiber coated with water blocking material that includes an essentially water free dispersion comprising a superabsorbent polymer and a dispersing medium. The water blocking material of the present invention is easily applied to the surface of fibers, has a good water blocking action, and does not impair the mechanical characteristics of the fiber. The fibers are usually used in the form of multi-filament yarns or fibrous materials such as nonwoven or other textile structures.

As used herein, the term "essentially water free" means that no free water is present in the dispersion except for water in a bound form that occurs naturally in the superabsorbent polymer or dispersing medium. Practically speaking, such water is present usually in an amount of less than two weight percent of the total weight of the dispersion.

Superabsorbent polymers useful in the invention can be a crosslinked, partially neutralized polyacrylic acid (see U.S. Pat. No. 4,654,039), a crosslinked, partially neutralized starch acrylic acid graft polymer (U.S. Pat. No. 4,076,663), a crosslinked, partially neutralized copolymer of isobutylene and maleic anhydride (U.S. Pat. No. 4,389,513), a superabsorbent polymer saponification product of vinyl acetate-acrylic acid copolymer (U.S. Pat. No. 4,324,748), a hydrolyzate of acrylamide polymer or acrylamide copolymer (U.S. Pat. No. 3,959,569), a hydrolyzate of an acrylonitrile copolymer (U.S. Pat. No. 3,935,099), mixtures thereof, or copolymers thereof. The teachings of the above patents are hereby incorporated by reference.

More specifically, examples of a superabsorbent polymer suitable for use in the dispersion of the invention include a partially or totally neutralized, partially or totally crosslinked poly(acrylic acid) derivative (PACA); a partially or totally crosslinked poly(sodium or potassium acrylamide-2-methyl-propane sulfonate) derivative (PAMPS); a partially or totally crosslinked poly(chloro-trimethylaminoethyl-acrylate) derivative (PCTA); a partially or totally crosslinked poly(acrylamide) derivative (PAAD); mixtures thereof; or copolymers thereof.

Examples of PACA include Sanwet® IM 3900 available from Hoechst AG, Aqua Keep® available from Atochem, and Dry Tech® available from Dow Chemical.

The superabsorbent polymer should be present on the coated fiber in an amount of from 0.05 to 10.0 weight percent based upon the weight of the uncoated fiber. A range of 0.1 to 5.0 weight percent is preferred because below 0.1 weight percent the water blocking effect may be insufficient in certain uses and above 5.0 weight percent the processability of the yarn can become more difficult because of deposit formation, for example. While it is possible to use higher loadings of the superabsorbent polymer, such higher loadings are not practical. If the fiber includes a sizing agent that is added prior to treatment of the fiber with the superabsorbent polymer dispersion, then the values for the percentage by weight refer to the dry weight of the untreated fiber without the sizing agent.

The superabsorbent polymer has a particle size less than 100 microns, preferably less than 20 microns, and more preferably less than 5 microns.

Superabsorbent polymers having particle sizes of 100 microns or greater may be used, but have problems of lumping or aggregate formation. These problems may be overcome by reducing the particle size of the superabsorbent polymer and dispersing the superabsorbent polymer in a dispersing medium.

The typical particle size of a commercial PACA, such as Aqua Keep® SHP10, is provided below:

| | |
|---|---|
| From 500 to 800 microns | 15–25% |
| From 225 to 500 microns | 25–35% |
| From 100 to 225 microns | 30–40% |
| Below 100 microns | 8–15% |

This table shows that commercial PACA includes polymer particles having a particle size much greater than that preferred for use in the present invention. Normally, such superabsorbent polymers are used to coat hygiene products which require polymers having a comparatively large particle size.

Therefore, another aspect of the present invention is to modify superabsorbent polymers so that such polymers have a particle size below 100 microns, preferably below 20 microns and more preferably below 5 microns.

There are four general methods for obtaining a superabsorbent polymer having a particle size less than 100 microns.

First, one can take superabsorbent polymers, such as the commercially available polymers mentioned above, and separate out the undesirable large particles by screening. The main drawback using this technique is that it has a very low and variable yield.

Therefore, the other three methods are preferred to prepare or obtain a superabsorbent polymer having an optimum particle size below 100 microns, preferably below 20 microns and more preferably below 5 microns. It is preferred that the particle size of the superabsorbent polymer is equal to or less than the diameter of the fiber to be coated.

One method is dry grinding of the superabsorbent polymer prior to dispersing the superabsorbent polymer in the dispersing medium. Particle size as low as 5 microns can be produced using the Condux® CGS air jet grinder from Condux® Maschinenbau GmbH & Co.

Another method is wet grinding of the superabsorbent polymer performed at high intensity, that is, grinding which takes place at greater than 12 000 RPM, such as by using the Megatron® MT 5000 micronizer from Kinematica AG, after the superabsorbent polymer has been dispersed into the dispersing medium.

Still another method is to make the superabsorbent polymer having a particle size less than 100 microns during the polymerization of the superabsorbent polymer from its monomeric ingredients. In this process, the superabsorbent polymer is prepared by providing a monomer of the superabsorbent polymers described above, partially or totally neutralizing the monomer, adding a catalyst and a crosslinking agent, raising the temperature of the monomer to initiate the polymerization of the monomer, maintaining the temperature during the polymerization, and evaporating the water to produce a polymer powder, all the while providing a shearing rate of at least 10,000 revolutions per minute during the entire process to produce a polymer having a particle size below 100 microns.

In another embodiment, before the polymerization step, the mixture of the totally or partially neutralized monomer, crosslinking agent and catalyst can be added to a reactor containing a hydrocarbon solvent to prepare an inverse suspension polymerization. The hydrocarbon solvent should be present in an amount 2 to 3 times the weight of the monomer, crosslinking agent and catalyst. The hydrocarbon solvent may be a C6, C7, or C8 alkane or an aromatic material. A preferred aromatic solvent is toluene. In the evaporation step, the solvent as well as the water should be removed.

In a preferred embodiment, a superwetting agent (SWA) can be added during the polymerization step by blending the SWA in the solvent in an amount from 0.05 to 10%, preferably 0.5% based on the weight of the solvent and SWA only. The SWA and solvent are added to the monomer solution, preferably in a weight ratio of SWA and solvent to the aqueous monomeric solution of from 1:1 to 3:1. The solvent and the water are removed by distillation at the end of the polymerization. The distillation temperature is adjusted depending on the solvent used, depending whether vacuum is available and depending whether azeotropic distillation can be performed. Typically a water-cyclohexane mixture can be removed at 80 to 90 C. under vacuum. It is also possible to add the SWA without solvent directly in the monomeric solution since the surfactant effect of the SWA is also observed in aqueous medium.

As used herein, the term "SWA" means a superwetting agent having surface tension below 30 millinewtons per meter (mN/m). Preferably, the SWA has a surface tension below 25 mN/m. Such SWAs are disclosed, for example, in *Polymeric Materials Encyclopedia*, Volume 10, Silicone Polymers, CRC Press 1996. This surface tension is lower than usual surfactants based on organic oils which are in the range of 30 to 35 mN/m.

Examples of SWAs include:
1. trimethylsilane;
2. a polyethylene oxide (PEO)-modified trimethylsilane, that is, a trimethylsilane branched with a polyether containing sequences of ethylene oxide propylene oxide (EO/PO), such as Tegopren® 5840 supplied by Th. Goldschmidt AG;
3. trisiloxane
4. a polyethylene oxide (PEO)-modified trisiloxane, that is, a trisiloxane branched with a polyether containing sequences of ethylene oxide propylene oxide (EO/PO), such as Tegopren® 5878 available from Th. Goldschmidt AG;
5. polydimethylsiloxane (PDMS)
6. a polyethylene oxide (PEO)-modified polydimethylsiloxane, that is, a polydimethylsiloxane branched with a polyether containing sequences of ethylene oxide propylene oxide (EO/PO), such as Tegopren® 7008 available from Th. Goldschmidt AG;
7. polyether modified siloxane such as the Tegopren® 5845 available from Th. Goldschmidt AG;

The advantage to using an SWA in polymerization is that a superabsorbent polymer having a relatively smaller particle size is obtained, that is, a superabsorbent polymer having a particle size below 5 microns, with a high percentage of particles below 1 micron. The smaller the particle size of the superabsorbent polymer, the faster that polymer will absorb water, and the lower the loading of the polymer on the fiber needs to be because of the improved distribution of the smaller particles inside the fiber.

The dispersing medium may be an oil, a superwetting agent, a blend of an oil and a superwetting agent, a finish oil composition, glycol, or mixtures thereof.

The oils which may be used in a superabsorbent polymer—oil dispersion include mineral oils, vegetable oils, and fully synthetic oils. Such oils should have a low viscosity, that is a kinematic viscosity of 50 to 350 mm$^2$/s at 20° C., preferably 80 to 200 mm$^2$/s at 20° C. Further, such oils should be thermally resistant, that is, losing either less than 5 weight percent when exposed to heating at 150° C. for 2 hours, or less than 15 weight percent when exposed to heating at 230° C. for 2 hours.

Examples of oils which may be used are those disclosed in U.S. Pat. No. 5,139,873 and U.S. Pat. No. 5,270,113. For example, U.S. Pat. No. 5,270,113 discloses a finish oil composition that includes 30–70% by weight of an esteroil lubricant composed of an alcohol and a carboxylic acid, 20–50% by weight of an emulsifying system composed of unstaturated ethoxylated fatty acids or alcohols or ethoxylated alkylamines, 5–15% of an antistatic agent, 0.2–2% of a corrosion inhibitor, and optionally other additives. In order for the oil to have the heat resistance described above, it is preferred that the esteroil is an aromatic derivative and the antistatic agent includes a derivative of a sulfonate and/or a phosphate. These oils may also include hydrophobic active ingredients such as ketene dimers as disclosed in U.S. Pat. No. 5,275,625.

For oils that include an emulsifying system, that emulsifying system may be replaced by an SWA as described above. In that case, the SWA, which does not include any solvent or water, is present in an amount of 0.05 to 50 percent by weight of the oil composition.

These oils advantageously contribute to the water blocking action of the superabsorbent polymer by allowing water to diffuse more easily between and among the superabsorbent polymer particles. Other advantages of these oils are that they enhance the processability of the coated fiber and they provide antistatic protection to the fiber.

If the dispersing medium is an oil that does not already include an SWA, then the oil dispersing medium may include an SWA. The SWA may be any of those described above, and is typically used in amounts of from 0.05 to 95, preferably 10 to 50, most preferably 30 weight percent based on the total weight of the SWA and oil only.

The SWA in an SWA-containing dispersing medium brings certain advantages to the water blocking material of this invention. The SWA enhances the hydrophilic-lipophilic balance of the superabsorbent polymer, dispersing medium and fiber to obtain a more homogeneous and faster dynamic wetting of the multifilament fiber surface which results in a homogeneous coating that allows a lower loading of superabsorbent polymer to obtain a desired water blocking effect. Further, this homogeneity and faster dynamic wetting allow the on-line application of the water blocking material to a fiber.

Alternatively, the dispersing medium may also be a water-free SWA alone.

If the dispersing medium includes glycol, the glycol may be ethylene glycol or propylene glycol or any other derivative of glycol. Further, the glycol may include an ethylene propylene oxide emulsifying agent. The glycol may advantageously contribute to the protection of the optical cable against freezing.

The dispersing medium may also include other antifreeze compositions such as dimethyl sulfoxide, potassium or sodium salts, or mixtures thereof. The amount of antifreeze composition may be easily evaluated knowing that 1.5 grams of glycol are required to lower the freezing point of 1 gram of water to −40° C.

After the superabsorbent polymer dispersion is applied to the fiber, the dispersing medium remains on the fiber. As stated above, the inventive water blocking material is essentially water free, which makes the material simpler to apply and simpler to use than water-in-oil based water blocking materials that require water and oil to be removed as one step in applying the acrylic water blocking material to a fiber.

As used herein, the term "fiber" includes fibers composed of organic and inorganic materials. As organic fibers one may use natural and synthetic fibers. Examples for natural organic fibers are cellulose fibers, wool fibers, silk fibers. Examples for synthetic organic fibers are rayon fibers, fibers of regenerated cellulose, aliphatic and aromatic polyamides, polyesters, polyolefines, polyacrylonitriles, polyvinyl chlorides, polyvinyl alcohols, and the like. Examples for inorganic fibers are glass fibers, carbon fibers, metal fibers, ceramic fibers, mineral fibers, boron fibers and the like. Preferred fibers include glass fibers, aramid fibers, nylon fibers, polyester fibers, such as fibers of poly(ethylene terephtalate) and polymethacrylates, and cellulose fibers including ones of regenerated cellulose.

Prior to being coated with the dispersion, it is preferred to dry the fiber so that it is bone dry to protect against blistering during the extrusion of the outer jacket of the cable and to protect against freezing when the cable is exposed to low temperatures. For the same reason, it is preferred that the superabsorbent polymer be bone dry prior to being dispersed in the dispersing medium.

For use in fiber optic cables, the fibers should have a specific breaking strength of 2.65 to 33.5 cN/dtex (3 to 38 g/den) and a specific modulus of 8.83 to 2297 cN/dtex (10 to 2500 g/den).

Aramid fibers are fibers of polymers that are partially, preponderantly or exclusively composed of aromatic rings, which are connected through carbamide bridges or optionally, in addition also through other bridging structures. The structure of such aramids may be elucidated by the following general formula of repeating units:

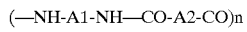
(—NH-A1-NH—CO-A2-CO)n wherein A1 and A2 are the same or different and signify aromatic and/or polyaromatic and/or heteroaromatic rings, that may also be substituted. Typically A1 and A2 may independently from each other be selected from 1,4-phenylene, 1,3-phenylene, 1,2-phenylene, 4,4'-biphenylene, 2,6-naphthylene, 1,5-naphthylene, 1,4-naphthylene, phenoxyphenyl-4,4'-diylen, phenoxyphenyl-3,4'-diylen, 2,5-pyridylene and 2,6-quinolylene which may or may not be substituted by one or more substituents which may comprise halogen, C1–C4-alkyl, phenyl, carboalkoxyl, C1–C4-alkoxyl, acyloxy, nitro, dialkylamino, thioalkyl, carboxyl and sulfonyl. The —CONH— group may also be replaced by a carbonyl-hydrazide (—CONHNH—) group, azo-or azoxygroup.

Further useful polyamides are disclosed in U.S. Pat. No. 4,670,343 wherein the aramid is a copolyamide in which preferably at least 80% by mole of the total A1 and A2 are 1,4-phenylene and phenoxyphenyl-3,4'-diylene which may or may not be subsituted and the content of phenoxyphenyl-3,4'-diylene is 10% to 40% by mole.

Fibers derived from wholly aromatic polyamides are preferred.

Examples of aramids are poly-m-phenylene-isophthalamide and poly-p-phenylene-terephthalamide.

Additional suitable aromatic polyamides are of the following structure

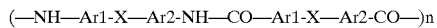
(—NH—Ar1-X—Ar2-NH—CO—Ar1-X—Ar2-CO—)n in which X represents O, S, SO2, NR, N2, CR2, CO.

R represents H, C1–C4-alkyl and Ar1 and Ar2 which may be same or different are selected from 1,2-phenylene, 1,3-phenylene and 1,4-phenylene and in which at least one hydrogen atom may be substituted with halogen and/or C1–C4-alkyl.

Additives may be used with the aramid and, in fact, it has been found that up to as much as 10% by weight, of other polymeric materials may be blended with the aramid or that copolymers may be used having as much as 10% of other diamine substituted for the diamine of the aramid or as much as 10% of other diacid chloride substituted for the diacid chloride of the aramid.

It is also possible to use fibers comprising mixtures of the above materials including hybrid fibers. Furthermore, two-component fibers may also be used in accordance with the invention, in which the core consists of a different material from the skin.

The fibers of the invention may be round, flat or may have another cross-sectional shape or they may be hollow fibers. Further, the term "fiber" includes endless fibers (filaments) and short fibrous structures, microfibers and multi-filaments. Further, the fibers may be made into yarns of short fibrous structures, which are spun, as well as yarns of endless fibers. The fibers may be used to make fibrous materials in woven, knitted or nonwoven form such as including fleeces, wadding, and felt.

The fibers coated with the water blocking material of this invention have an excellent water blocking effect because the superabsorbent polymer applied to the fiber swells when contacted with water and thus prevents further penetration of the water along the fibers. The mechanical characteristics of the fiber are not impaired by the superabsorbent polymer deposited on it. Since a good water blocking action is already achieved with small quantities of superabsorbent polymer on the surface of the fiber, the weight and volume of the fiber do not substantially increase so that the coated fibers may be used in the same applications as uncoated fibers with similar processability characteristics.

The fibers made according to this invention may be used, for example, as fiber reinforcing material used in the manufacture of cables, and in particular of fiber optical cables that use optical light wave guides for optical communication transmissions. In fiber optic cables, multi-filaments of glass, aramids or other strength members are used as tensile load relief fibers or as reinforcing fibers. However, the fibers of the invention are not limited to these uses and may be used in any application where it is desired to absorb water in order to hinder the propagation of the water.

The dispersion of the superabsorbent polymer in the dispersing medium contains from 0.1 to 70 % by weight of superabsorbent polymer, preferably from 20 to 40%, based upon the total weight of dispersing medium and superabsorbent polymer only. If the dispersing medium includes an SWA, then relatively lower amounts of the superabsorbent polymer are needed to obtain a desired water blocking effect. Higher loadings of the superabsorbent polymer may be used, but become impractical because the stability of the dispersion decreases. The quantity of the superabsorbent polymer used in the dispersion to coat the fiber is selected from the indicated range above based upon the viscosity of the dispersing medium so as to provide a uniform coating of the dispersion on the surface of the fiber. This is especially important when the fiber is in the form of a yarn, multi-filament or fibrous material, because when the water blocking material is applied to these materials it is desired to obtain the best penetration into the yarn or bundles of yarn in order to coat as many fibers as possible.

The dispersion may be made simply by adding the superabsorbent polymer in powder form into the dispersing medium while stirring the dispersing medium at a rate that insures a uniform distribution of the superabsorbent polymer into the dispersing medium. If an impregnating bath is used to coat the fiber by passing the fiber through the bath, then the dispersion is continuously held in motion, for example by stirring.

The size of the fibers for many applications, such as for use in fiber optic cables, is in the range of from 10 to 15 microns, and therefore the superabsorbent polymer particles should have a particle size below 100 microns, preferably below 20 microns, and more preferably below 5 microns.

The dispersion may be applied to the fiber by any conventional coating process, for example by roll coating with or without doctor blade, spray coating, immersion coating, a serpentine system, or using a finish application (e.g. metering system), or using any other known coating devices. If desired the dispersion may be applied in a multi step process in which the fiber is coated several times with the dispersion. Ultrasonic systems may also be used in order to enhance the uniformity or penetration of the dispersion. With fibers, it is preferred to use an immersion coating method in which the oil dispersion is present in an impregnating bath and the fibers to be treated are passed through the bath. However, at higher coating speeds a metering applicator may be preferred. With fibrous materials of two-dimensional form, other processes such as spray coating may be used in addition to immersion coating.

The coating speed may be adjusted between 0.1 and 1200 m/min depending on the selected process. A process in which the dispersing medium, such as the oil, is not removed, has the additional advantage of significantly increasing the coating speed, and thus the productivity, since one can coat the fiber at high speeds without being limited by the residence time required to evaporate the dispersing medium. Typical speeds are 60 m/min for the fiber treatment other than during the spinning process, and 800 m/min for the coating speed during the manufacturing of the fiber.

Polymeric fibers are known to absorb moisture. Therefore it is preferred to precondition the fiber in order to feed a bone dry fiber to the coating process. This may easily be achieved by conventional fiber drying techniques, or advantageously during the spinning of the fiber.

The temperature of the dispersion may be selected in order to enhance the fiber penetration and coverage uniformity and is only limited by the temperature resistance of the dispersion components. Nonetheless a range of 10 to 100 C. is preferred, with a range of from 35 to 75 C being more preferred.

The invention will be explained in more detail with reference to the following examples.

EXAMPLES

Example 1

This Example is directed to a method for producing a superabsorbent polymer which has a particle size of below 100 microns from a monomer.

A Megatron® MT5000 reactor was fitted with a device to introduce solids as well as liquids, said reactor having a high intensity micronizer cell rotating at 16000 RPM, a system for purging with inert gas, a series of temperature probes and a heating and cooling device consisting of a jacket in which a heat transfer fluid is circulated at a targeted precise temperature. This reactor was used to polymerize a monomer yielding a superabsorbent polymer having particle sizes below 100 microns.

The micronizer was set at a rotation speed of 16000 RPM, and a given amount of aqueous solution containing about 80% by weight of hydroquinone stabilized acrylic acid was quantitatively neutralized with a sodium or potassium hydroxide solution at 20%. This was done in a way that the temperature in the micronizer did not exceed 35 C.

Once the temperature was stabilized, 2.8% by weight relative to the amount of acrylic acid, of an aqueous solution of sodium persulfate at 2% was added to the reactor. The sodium persulfate solution acted as a catalyst in the polymerization. This solution can be substituted by any similar catalyst known in the art for use in related reactions. While the temperature was carefully maintained at 30° C., 0.5% by weight of ethylene glycol diglycidyl ether, relative to the amount of acrylic acid, was added to the reactor. The ethylene glycol diglycidyl ether acted as a crosslinking agent in the polymerization of the acrylic acid, but can be substituted by any similar crosslinking agent known in the art that is at least a bifunctional covalent crosslinking agent or ionic crosslinking agents such as aluminum sodium sulfate. The temperature was raised at 40° C. and maintained for a stabilization period of 15 minutes while nitrogen was purged through the reactor.

After this 15 minute period the temperature of the liquid in the reactor was raised to 70° C. to allow the polymerization to start. The contents of the reactor was maintained carefully at this temperature for about 30 minutes which is sufficient to obtain quantitative polymerization of the neutralized acrylic acid. The rotational micronizer speed of 16000 RPM was maintained throughout the polymerization. The temperature was then raised to 125° C. to remove the water phase by evaporation. This separation can also be done by mechanical means such as ultrafiltration or centrifugation. After complete evaporation of the water a superabsorbent polymer was obtained in the form of very fine particle size well distributed below 20 microns.

After suitable purification the superabsorbent polymer powder can be used to prepare the dispersion of the invention. The process described here can be easily adapted to polymerize particles of other superabsorbent polymers of the invention to sizes of below 100 microns. The typical particle size distribution was as follows:

50% of the particles were below 8 microns;

10% of the particles were below 3 microns;

90% of the particles were below 12 microns.

The particle size was measured using a Mastersizer® Micron from Malvern Instruments Ltd. U.K. suitable for the analysis of particle size ranging from 0.3 to 300 microns either in dry or wet media.

Example 2

A finish free yarn of para-aramid fibers (Kevlar® type 49, 1580 dtex), comprising poly-para-phenylene diamine terephthalamide was treated with a dispersion of 35% (by weight) superabsorbent polymer as prepared according to Example 1 in a finish oil as disclosed in U.S. Pat. No. 5,270,113 which included 30–70% by weight of an esteroil lubricant composed of an alcohol and a carboxylic acid, 20–50% by weight of an emulsifying system composed of unstaturated ethoxylated fatty acids or alcohols or ethoxylated alkylamines, 5–15% of an antistatic agent, and 0.2–2% of a corrosion inhibitor. The main component of finish oil was an esteroil lubricant synthesized from an alcohol and a carboxylic acid, and had suitable hydrophilic properties to allow rapid spreading of water among superabsorbent polymer particles thereby enhancing the water blocking effect of the superabsorbent polymer. The yarn was coated with a dispersion which yielded a coating on the yarn which had an amount of 2.5% superabsorbent polymer and 4.5% oil, based on the dry weight of the uncoated yarn.

The so obtained para-aramid yarn, coated with the mentioned dispersion, was tested for its water blocking property in the column test described below.

The Column Test Procedure:

The water blocking action of the yarn of this Example was determined using the through-flow test. In this test the inner cylindrical space of a section of glass tube open on both ends was filled with a bundle of the yarn, such that the longitudinal axis of the yarn bundle was substantially parallel with the longitudinal axis of the cylindrical space in which the bundle was positioned. The tube filled with the yarn was cut through in a direction perpendicular to its longitudinal axis in two places, such that a cylinder-shaped test tube of a length of 50 mm was formed such that the ends of the yarn bundle present in the thus obtained test tube approximately coincided with the test tube ends. Next, one of the ends of the test tube was connected with the contents of a vessel of water and subjected to the pressure of a head of water of a particular height. The time required to wet the entire yarn bundle in the test tube is referred to as the through-flow time. This time is a measure of the water blocking action of the yarn. The through-flow time was taken to be the time which passes after the application of water pressure to one end of the test tube and prior to the first drop appearing at the other (free) end.

The through-flow test was carried out under the following conditions:

| | |
|---|---|
| Type of test tube | Glass |
| Test tube, inner diameter | 5 mm |
| Test tube, outer diameter | 7 mm |
| Length of test tube | 50 mm |
| Number of yarns in test tube | 100 |
| Number of measurements | 1 per test tube |
| Height of liquid head | 100 cm |
| Testing liquid | Demineralized water |

The number of yarns in the test tube was chosen such that the bundle formed from them will fully fill the inner cylindrical space of the test tube. For a yarn linear density of dtex 1580 this number was found to be 100, giving an overall linear density for the yarn bundle of dtex 158 000. A yarn coated according to this Example passed the column test. Effective water blocking activity was still maintained after 3 weeks when the test was ended.

Examples 3–5

Aqua Keep® SHP10 polymer was dry ground twice in a Condux® CGS air jet grinder from Condux® Maschinenbau GmbH & Co, and the polymer had the following particle size:

50% of the particles were below 9 microns;
10% of the particles were below 4 microns;
90% of the particles were below 15 microns.

This ground polymer was used to make dispersions as in Example 2 with varying amounts of superabsorbent polymer and the finish oil of Example 2. Yarns of dtex 1580 were coated according to Example 2 with the loadings as set forth below.

| | Wt. % oil | Wt. % SAP* | column test time |
|---|---|---|---|
| Example 3 | 2.3 | 1.2 | >3 weeks |
| Example 4 | 2.6 | 1.4 | >3 weeks |
| Example 5 | 4.5 | 2.5 | >3 weeks |

* = superabsorbent polymer

As indicated above, the yarns from each of Examples 3, 4 and 5 passed the column test and effective water blocking activity was still maintained after 3 weeks when the test was ended.

Examples 6–8

A dispersion was made as in Example 2 using Aqua Keep® SHP10 polymer (not ground) and the finish oil in that Example. The dispersion was wet ground for 30 minutes at 12,000 RPM using the Megatron® MT 5000 micronizer from Kinematica AG. The temperature in the micronizer was maintained at 15° C.

The polymer in the dispersion had the following particle size:

50% of the particles were below 12 microns;
10% of the particles were below 5 microns;
90% of the particles were below 19.5 microns.

Yarns were coated as in Example 2 using dispersions having varying amounts of superabsorbent polymer and finish oil as set forth below.

| | Wt. % oil | Wt. % SAP* | column test time |
|---|---|---|---|
| Example 6 | 2.3 | 1.2 | >3 weeks |
| Example 7 | 2.6 | 1.4 | >3 weeks |
| Example 8 | 4.5 | 2.5 | >3 weeks |

* = superabsorbent polymer

As indicated above, the yarns from each of Examples 6, 7 and 8 passed the column test and effective water blocking activity was still maintained after 3 weeks when the test was ended.

Comparative Example 9

A Kevlar® 49 finish free yarn, 1580 dtex, was treated as in Example 2 with about 1 weight percent finish oil without the superabsorbent polymer. The finish oil was the same as used in Example 2. The water blocking performance of the yarn was measured in a water column test device as in Example 2, using the same amount of yarn, and after 2 minutes the yarn did not block the water but let it run through the column.

Comparative Example 10

A Kevlar® 49 finish free yarn was treated as in Comparative Example 9 except that the yarn was coated with about 5 weight percent finish oil. The water blocking performance of the yarn was measured in a water column test device as in Example 2, using the same amount of yarn, and after 2 minutes the yarn did not block the water but let it run through the column.

Example 11

A superabsorbent polymer was made as in Example 1, except that a superwetting agent (SWA)-solvent solution was added to the aqueous monomeric solution prior to initiating the polymerization while maintaining the mincronizer cell rotating speed at 16000 RPM.

A SWA-solvent solution was prepared by adding 0.5 weight percent of Tegopren® 5845 silicone wetting agent to 99.5 weight percent of cyclohexane. The dissolved oxygen had been removed from the cyclohexane using nitrogen purging before being added to the SWA.

The polymerization of the monomer was performed as in Example 1, and the cyclohexane and water were then removed from the polymer by vacuum distillation at 80–90 C. The particle size distribution of the polymer was as follows:

10% of the particles were below 0.3 microns;

50% of the particles were below 0.8 microns; and

90% of the particles were below 3 microns.

The particle size was measured using a Mastersizer® Micron from Malvern Instruments Ltd. U.K. suitable for the analysis of particle size ranging from 0.3 to 300 microns either in dry or wet media.

Example 12

A finish free yarn of bone dry para-aramid fibers (Kevlar® type 49, 1580 dtex) was treated as in Example 2 except that the superabsorbent polymer used was that prepared according to Example 11. A yarn coated according to this Example passed the column test. Effective water blocking activity was still maintained after 3 weeks when the test was ended.

Examples 13–14

Yarns were treated with a superabsorbent polymer as follows. A superabsorbent polymer was prepared according to Examples 3–5. The ground superabsorbent polymer was added to a dispersion medium of a water-free finish oil as in Example 2 and a superwetting agent of Tegopren® 5845 in varying amounts. In Examples 13 and 14, the proportion of components was 30 weight percent superabsorbent polymer, 50 weight percent of water-free finish oil, and 20 weight percent of Tegopren® 5845.

Yarns were coated according to Example 2 with the loadings as set forth below.

|  | Wt. % oil and SWA | Wt. % SAP | column test time |
| --- | --- | --- | --- |
| Example 13 | 1.2 | 0.6 | >3 weeks |
| Example 14 | 2.4 | 1.2 | >3 weeks |

As indicated above, the yarns from Examples 13 and 14 passed the column test and effective water blocking activity was still maintained after 3 weeks when the test was ended.

What is claimed is:

1. In a process for preparing a superabsorbent polymer by providing an aqueous monomer solution, raising the temperature of the monomer to initiate the polymerization of the monomer, maintaining the temperature during the polymerization, and evaporating the water to produce a polymer, the improvement which comprises providing a shearing rate of at least 10,000 revolutions per minute during the entire process to produce a polymer having a particle size below 100 microns.

2. The process of claim 1 further comprising the step of partially or totally neutralizing the monomer.

3. The process of claim 1 further comprising the step of partially or totally cross linking the polymer.

4. The process of claim 1 further comprising adding a hydrocarbon solvent to the monomer before polymerization.

5. The process of claim 1 wherein an excess of a cross linking agent is added to the monomer.

6. The process of claim 4 wherein the cross linking agent is a glycol derivative.

7. The process of claim 1, further comprising the step of adding superwetting agent having a surface tension below 30 millinewtons per meter to the monomer prior to polymerization.

8. The process of claim 7, wherein the superwetting agent is dispersed in an hydrocarbon or aromatic solvent.

9. The process of claim 8 wherein the dispersion includes from 0.05 to 10 weight percent of the superwetting agent and from 80–99.95 weight percent of the solvent.

10. The process of claim 8, wherein the ratio of superwetting agent and solvent to aqueous monomer solution is from 1:1 to 3:1.

11. The process of claim 7, wherein the superwetting agent is selected from the group consisting of trimethylsilane, a polyethylene oxide (PEO)-modified trimethylsilane, trisiloxane, a polyethylene oxide-modified trisiloxane, polydimethylsiloxane, a polyethylene oxide-modified polydimethylsiloxane, and polyether modified siloxane.

* * * * *